United States Patent [19]

Sugimori et al.

[11] Patent Number: 4,961,112

[45] Date of Patent: Oct. 2, 1990

[54] TELEVISION SYSTEM

[75] Inventors: Yoshio Sugimori; Yousai Araki; Joji Urano, all of Tokyo, Japan

[73] Assignee: Nippon Television Network Corporation, Tokyo, Japan

[21] Appl. No.: 299,120

[22] Filed: Jan. 19, 1989

[30] Foreign Application Priority Data

Oct. 22, 1988 [JP] Japan ................................. 63-266848

[51] Int. Cl.⁵ ............................................. H04N 7/01
[52] U.S. Cl. ..................................... 358/141; 358/140
[58] Field of Search ........................ 358/141, 140, 160

[56] References Cited

PUBLICATIONS

Schreiber, Wm. F., "6 mHz Single Channel HDTV Systems", Ottawa, HDTV Symposium, Oct. 1987, 10 pages.

Primary Examiner—Howard W. Britton
Attorney, Agent, or Firm—Sughrue, Mion, Zinn, Macpeak & Seas

[57] ABSTRACT

In transmitting, on a transmission side, a laterally long image whose aspect ratio is different from a usual television screen having aspect ratio of 3:4, with a top and a bottom portions of the screen being image-free, auxiliary signal obtained by shifting a signal component corresponding to a different in frequency band determined by the number of scan lines corresponding to a height of the image and a signal component exceeding a horizontal frequency band determined by a luster line length to lower frequency sides, respectively, are inserted into the image-free portions, which are used in a receiving side. In the receiving side, the auxiliary signals are separated in time from the image signal and processed separately.

4 Claims, 4 Drawing Sheets

TELEVISION SYSTEM

BACKGROUND OF THE INVENTION

The present invention relates to a television system suitable for use in receiving a video signal containing a cinemascope image and, particularly, to such a television system capable of improving a resolution of a cinemascope image on a conventional television receiver screen by an effective utilization of upper and lower portions of the screen where there is no image displayed.

Responsive to recent demand for a high quality television system, various systems have been proposed. As an example of such proposals, Massachusetts Institute of Technology developed a single channel, high resolution television system. According to this system, a vertical dimension of an NTSC frame is reduced and signals providing an improvement of resolution are arranged in a space provided by the reduction of the vertical dimension of the frame. (cf. "Spectrum" No. 11, pp 20 to 25, Nov. 1988, Maruzen Co.)

As another example, a proposal for improving a vertical resolution of a television screen having an aspect ratio of 3:4 has been made in which resolution improving scan lines corresponding in number to required scan lines are formed in a television receiver to scan lines each disposed between adjacent scan lines of an image and carrying a signal thereon which corresponds to a difference between signals on the adjacent scan lines, so that the number of scan lines appears doubled.

The above mentioned single channel, high resolution system improves only the vertical resolution of the image, so that the degree of resolution improvement of image may be partial.

On the other hand, in the scan line doubling technique, it is very difficult, in a transmission side, to transmit all of the scan lines even when the additional scan lines are assigned to a portion or portions which are free from an image signal as in the case of cinemascope image transmission. Therefore, this technique could only effective in improving the vertical resolution if the above difficulty were overcome.

SUMMARY OF THE INVENTION

An object of the present invention is to provide a television system by which both vertical and horizontal resolutions of even a cinemascope image can be improved reliably.

The above object can be achieved, according to the present invention, by transmitting, on a transmission side, a laterally long image whose aspect ratio is different from a conventional television screen having aspect ratio of 3:4, with upper and lower portions of the screen being image-free and carrying an auxiliary signal obtained by shifting a signal component corresponding to a difference in frequency band determined by the number of scan lines corresponding to a height of the image and a signal component exceeding a horizontal frequency band determined by a raster line length to lower frequency sides, respectively, and by using, on a receiving side, the auxiliary signal to improve a resolution.

In the receiving side, the auxiliary signal is separated in time from the image signal and processed separately.

That is, in the transmission side, the signal component having frequencies within a frequency band corresponding to the difference between the frequency band determined by a total number of luster scan lines (e.g. 480 lines) and the signal component having frequencies within the vertical frequency band determined by the number of scan lines (e.g. 360 lines) included within a height of a new image is shifted to a lower frequency side and a resultant signal component is inserted into the image free portions for improvement of the vertical resolution. Further, in order to improve the horizontal resolution, the horizontal signal component whose frequency exceeds the horizontal frequency band determined by a lateral width of the new image which is equal to a lateral width of the luster is shifted to a lower frequency side and a resultant signal component is inserted into the image-free portions simultaneously with the insertion of the shifted signal component for the vertical resolution. The composite signal, i.e., the image signal and the frequency-shifted signal components inserted into the image-free portions, are transmitted.

In the receiver side, the inserted signal components are separated in time. After their frequencies are shifted to higher frequency sides, they are mixed with signals which are expanded vertically and horizontally and displayed.

DETAILED DESCRIPTION OF THE PREFERRED EMBODIMENT

Figure 1:
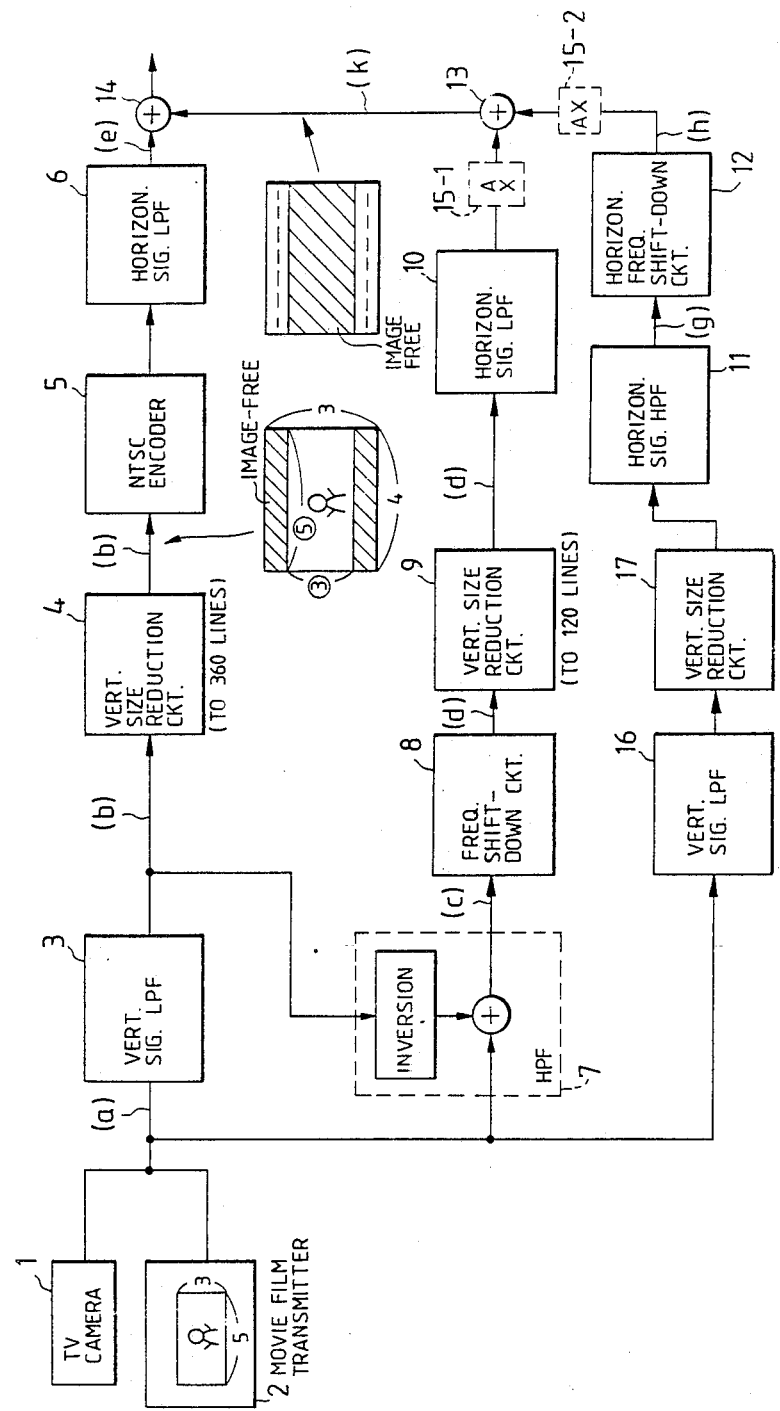
FIG. 1 is a block circuit diagram showing a construction of a transmission side of an embodiment of the present invention.

In FIG. 1 which shows a construction of a transmission side of an embodiment of the present invention, the transmission side system includes a TV camera 1 and a film TV camera 2 for use in broadcasting a movie film. The TV camera 1 and the film TV camera 2 are used selectively. The system further includes a vertical low-pass filter 3 which has an input connected to the TV camera 1 or the film TV camera 2, selectively, a size squeezing circuit 4 connected to an output of the low-pass filter 3 for reducing a vertical size of the vertical vertical signal, an NTSC encoder 5 connected to an output of the circuit 4, a horizontal low-pass filter 6 connected to the output of the TV camera 1 or the film TV camera 2, a high-pass filter 7, a frequency shiftdown circuit 8, a vertical size reduction circuit 9 for reducing a vertical size of an image, a horizontal low-pass filter 10, a high-pass filter 11 for the horizontal signal, a horizontal frequency shift-down circuit 12, signal adders 13 and 14 and auxilary circuits AX 15-1 and 15-2 to be described later.

When a movie film of cinemascope size having an aspect ratio of 3:5 is transmitted in full width by the film TV camera 2 and received as it is by an NTSC television receiver having an aspect ratio of 3:4, an image displayed on a screen of the television receiver includes upper and lower image-free portions.

Figure 2:
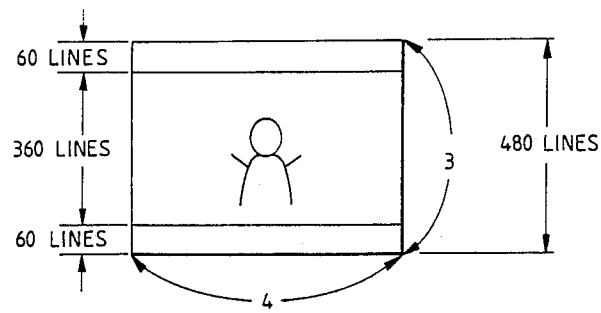
FIG. 2 shows a raster construction

That is, as is clear from a construction of the NTSC scan raster shown in FIG. 2, information is transmitted and received in the NTSC system by 525 horizontal scan lines and, among them, 480 scan lines or so are used in a typical screen. A horizontal scanning frequency is 15.75 KHz due to the fact that interlaced scanning is used and 30 images are required per second. Assuming a special case where a monochromatic signal is displayed by every other scan line, a spatial frequency in a vertical directive image screen is (480/2) CPH (Cycle Per Height).

FIGS. 3a to 3k show spatial frequency signal waveforms at various points a to k of the system shown in FIG. 1, respectively. In the respective figures, an ordinate shows the vertical spatial frequency and an abscissa shows frequency band values obtained by converting the vertical spatial frequency into a horizontal frequency in herz.

Figure 3A:
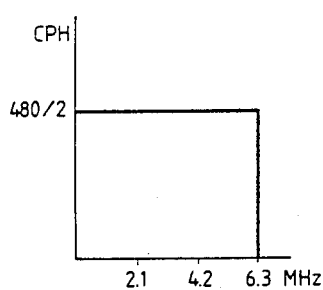
FIG. 3 shows signals at various points in FIG. 1.
Figure 3B:
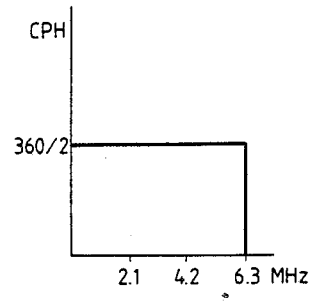

In FIG. 3a which shows an output image signal of the film TV camera 2 transmitting a cinemascope film, an image expressed vertically by 480 scan lines is transmitted by 360 scan lines as shown in FIG. 3b, while being transmitted horizontally in full size. Therefore, at least a portion of the image in the vertical direction is lost, resulting in a degraded vertical resolution, as shown by an illustration at an output of the vertical size squeezing circuit 4 in FIG. 1.

According to the present invention, an information capable of improving the total resolution of the image, i.e., signal portions which are not transmitted, is inserted into the image-free portions after a shift in frequency.

IMPROVEMENT OF VERTICAL RESOLUTION

Figure 3C:
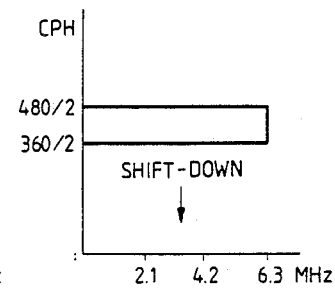
Figure 3D:
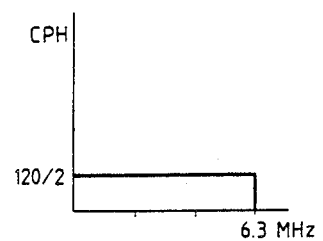
Figure 3E:
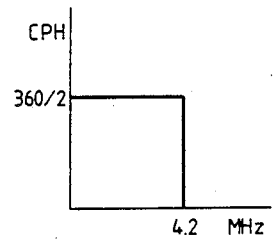

The waveform at the point b in FIG. 1 is obtained by passing the output of the movie film TV camera 2 through the low-pass filter 3 such that the spatial frequency of the vertical component of the image is limited to (360/2)CPH, such that the signal passed through the low-pass filter 3 is compressed in size within a range corresponding to 360 lines as shown in FIG. 2 and transmitted, while signals shown in FIG. 3c as being not passed therethrough are compressed similarly to a top portion of the raster corresponding to 60 lines and a bottom portion of the raster corresponding to 60 lines and transmitted, respectively. In order to obtain the signal shown in FIG. 3c, the signal shown in FIG. 3b is inverted by the high pass filter 7 and added to the signal shown in FIG. 3a. Then, the signal in FIG. 3c is shifted down in frequency by the frequency shift-down circuit 8, resulting in the signal shown in FIG. 3d. In a case where only the vertical resolution is to be improved, it may be possible that the signal shown in FIG. 3d is added by the adder 14 to the signal shown in FIG. 3e and a resultant signal is transmitted. In order to simplify an explanation of the vertical bands in FIGS. 3a to 3k, the outputs of the vertical size reducing circuits 4 and 9 among the three vertical size reducing circuits 4, 9 and 17, which are shown in FIGS. 3b and 3d, are indicated by those before reduced.

IMPROVEMENT OF HORIZONTAL RESOLUTION

Figure 3F:
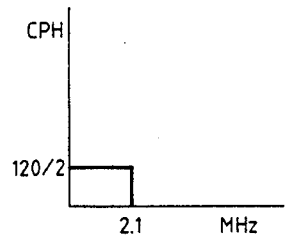
Figure 3G:
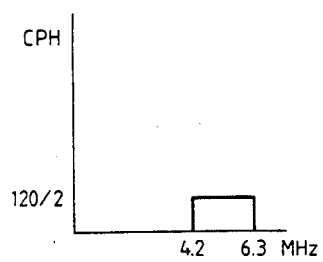
Figure 3H:
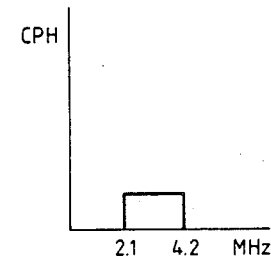
Figure 3K:
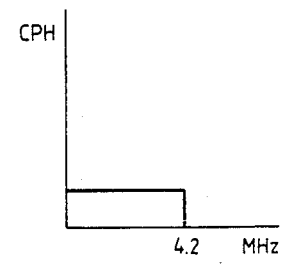

In order to improve the horizontal resolution, too, the signal shown in FIG. 3d is processed further. The signal has a horizontal frequency up to 6.3 MHz. When passed through the low-pass filter 10, a signal shown in FIG. 3f is obtained. On the other hand, the signal in FIG. 3a is passed through the vertical signal low-pass filter 16 and, then, through the vertical size reduction circuit 17 and the horizontal signal high-pass filter 11, resulting in a signal shown in FIG. 3g. The latter signal is passed through the frequency shift-down circuit 12 to obtain a signal shown in FIG. 3h. The signals in FIGS. 3f and 3h are added by the adder 13. Thus, a transmission band of all of the horizontal signals is limited to 4.2 MHz.

Now, the signal processing at the receiving side will be described.

Figure 4:
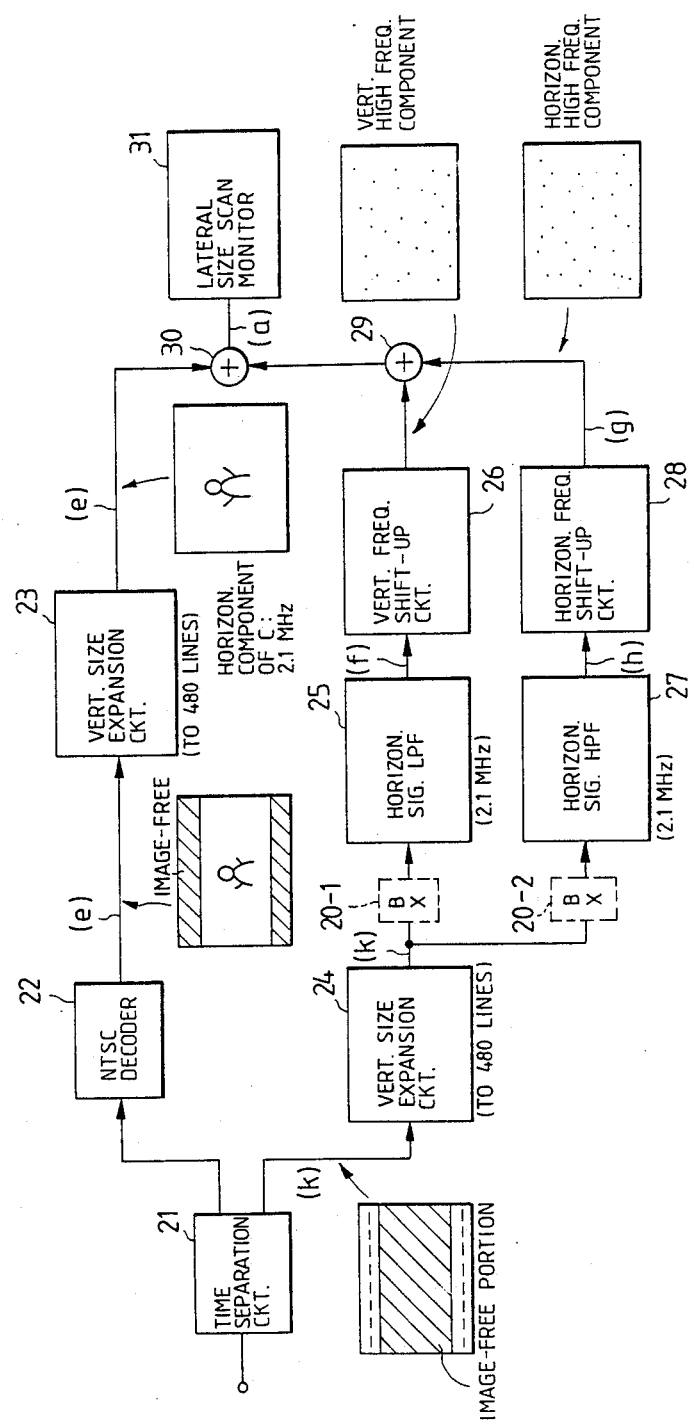
FIG. 4 is a block circuit diagram showing a construction of a receiver side of the embodiment of the present invention.

FIG. 4 shows a construction of the receiving side, corresponding to the transmission side shown in FIG. 1. In FIG. 4, auxiliary circuits BX are shown by 20-1 and 20-2 which are described in detail later. A reference numeral 21 depicts a time separation circuit for, for example, counting the scan lines and separating it from a signal, 22 an NTSC color decoder, 23 and 24 vertical size expanding circuits, 25 a horozontal signal low-pass filter, 26 a vertical frequency shift-up circuit, 27 a high-pass filter a horizontal signal, 28 a horizontal frequency shift-up circuit, 29 and 30 adders and 31 a lateral size scan monitor. In FIG. 4 letters k to a are circuit points providing the corresponding waveforms shown in FIG. 3.

In FIG. 4, after the received signal is demodulated, it is separated by the time separation circuit 21 to signals k corresponding to the top and bottom portions of the screen and an intermediate portion of the screen signal. The latter is decoded by the NTSC color decoder 22 and a resultant waveform e is expanded vertically by the size expansion circuit 23. The signal k is also expanded by the size expansion circuit 24 and the expanded signal is passed through the horizontal signal low-pass filter 25 to derive a horizontal low frequency signal having a waveform f. Then, this is shifted-up by the frequency shift-up circuit 26 to obtain a signal similar to the waveform c. Although, in this case, the horizontal frequency band is 2.1 MHz at most, it includes components of high frequency in the vertical direction. Further, the signal k is passed through the horizontal signal high-pass filter 27 to obtain a waveform h. Then, the latter is passed through the horizontal frequency shift-up circuit 28 to obtain a waveform g. Since the signal g contains horizontal high frequency components, a signal containing high frequency components in both vertical and horizontal directions can be obtained by adding the signal g to the signal similar to the signal c by the adder 29. Thereafter, by adding the resultant signal to the signal b by the adder 30, a signal similar to the signal a is obtained and thus an image having high resolution in both vertical and horizontal directions. Therefore, an image having high resolution can be displayed on the laterally long size scan monitor 31. If it is displayed on a conventional television screen, and image-free portion appears in the top portion as well as the bottom portion of the screen.

PROCESSING OF VISUALLY NOTICEABLE INSERTION SIGNAL

Figure 5:
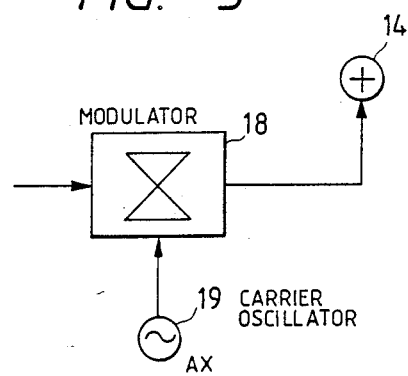
FIGS. 5 and 6 show means for suppressing undersired effects of an auxiliary signal used in the present invention, respectively.

When the described processing is performed, there may be a case, in the conventional television receiver, where the signals inserted to improve the resolution are noticeable in the image-free portions on the screen. In order to solve this problem, the auxiliary circuits AX 15-1 and 15-2 of the transmission side shown in FIG. 1 are provided. FIG. 5 shows one of the auxiliary circuits AX, in detail.

In FIG. 5, the auxiliary circuit AX includes a modulator 18 and a carrier oscillator 19. That is, prior to the addition of the original image signal to the auxiliary signals for resolution improvement in the adder 14, the respective auxiliary signals are modulated with predetermined carrier signals by the modulators 18. In this case, the carrier signals produced by the oscillators 19 have a common frequency and may be separated in phase from each other by 90° so that they can be separated in the receiving side even if they are transmitted simultaneously. The frequency of the carrier oscillators 19 is preferably an odd number multiple of a half of horizontal scan frequency of 15.75 KHz, that is, to be selected such that an interleaved relation is established between the scan frequency and the carrier frequency. With this scheme, the inserted signals in the image-free portions take on the form of dots deviated vertically from each other and thus the visual effect of them becomes negligible. The modulator 18 is preferably an amplitude modulator of carrier restriction type, i.e. a double balanced modulator. In such case it is necessary that the frequency shift-down circuit 12 shown in FIG. 1 shifts the signal frequency of 4.2 to 6.3 MHz down to 0 to 2.1 MHz.

Figure 6:
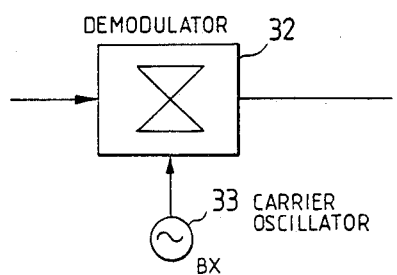

FIG. 6 shows one of the identical auxiliary circuits BX 20-1 and 20-2 shown in FIG. 4. In FIG. 6, the auxiliary circuit BX includes a demodulator 32 and a carrier oscillator 33 and is inserted into the output side of the vertical size expansion circuit. An oscillation frequency of the carrier oscillator 33 is the same as that of the carrier oscillator 17 of the auxiliary circuit AX in the transmission side shown in FIG. 1. In this case, the horizontal frequency shift-up circuit 28 shown in FIG. 4 operates to shift a signal of 0 to 2.1 MHz up to 4.2 to 6.3 MHz. In this case, the horizontal signal high-pass filter 27 may be omitted.

If the visual effect of the insertion signal on the television screen still exists, it may be possible to provide a memory device for temporarily storing respective scan signals of the upper and the lower image-free portions and then to read them out from the memory device every other scan line in a reverse direction. In such a case, even a signal containing a movement on the screen is cancelled out visually.

As above, according to the present invention, the auxiliary signals for improving the vertical and horizontal resolutions of a laterally long image are inserted into the image-free portions on the screen and thus it is possible to improve the resolutions reliably. Therefore, when such cinemascopic image is monitored by a monitor having the same aspect ratio as that of the image, it is possible to obtain a high resolution image and, when it is displayed on a conventional television screen, the auxiliary signals do not provide undesirable effects on the image-free portions thereof.

What is claimed is:

1. A television signal transmission system in which a laterally long image is transmitted and displayed on a screen of a television receiver having an aspect ratio of 3:4, with a top and bottom image-free portion on said screen, auxiliary signal for improving a resolution of the image displayed on said screen being inserted into said top and said bottom image-free portions, said auxiliary signal including a first signal obtained by shifting a frequency of a vertical signal component corresponding to a difference between vertical frequency bands determined by the total number of raster scan lines of said television screen and by the number of raster scan lines corresponding to a height of said image on said screen, respectively, down and a second signal obtained by shifting a frequency of a horizontal signal component exceeding a horizontal frequency band determined by a lateral length of said image on said screen corresponding to a length of a raster scan line down.

2. The television signal transmission system as claimed in claim 1, wherein said auxiliary signal modulates predetermined carrier signals such that said auxiliary signal appears on said image-free portions of said screen as dots.

3. The television signal transmission system as claimed in claim 1, wherein said auxiliary signal modulates predetermined carrier signals such that said auxiliary signal appears on said image-free portions of said screen as dots and wherein said auxiliary signal is inserted into said top image-free portion and said bottom image-free portion with a horizontal pixel arrangement being reversed every scan line.

4. A television signal receiving system for receiving a transmission signal from said transmission system claimed in claim 1, said auxiliary signal inserted in said transmission system being separated in time from said image signal, said auxiliary signal being shifted up in frequency, a frequency of a signal corresponding to a center portion of said image being added to said frequency shifted up auxiliary signal.

* * * * *